(12) United States Patent
Hwang

(10) Patent No.: US 6,532,372 B1
(45) Date of Patent: Mar. 11, 2003

(54) METHOD OF PROVIDING A DIGITAL MOBILE PHONE WITH DATA COMMUNICATION SERVICES

(75) Inventor: Hyo-Hyun Hwang, Suwon (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/391,150

(22) Filed: Sep. 7, 1999

(30) Foreign Application Priority Data

Sep. 7, 1998 (KR) ............................................. 98-36798

(51) Int. Cl.⁷ ............................... H04B 1/38; H04M 1/00

(52) U.S. Cl. ....................................... 455/559; 455/557

(58) Field of Search ................................. 455/559, 557, 455/414, 550, 556, 462

(56) References Cited

U.S. PATENT DOCUMENTS

| | | | | |
|---|---|---|---|---|
| 5,915,224 A | * | 6/1999 | Jonsson | 455/552 |
| 6,038,457 A | * | 3/2000 | Barkat | 455/556 |
| RE37,141 E | * | 4/2001 | O'Sullivan | 455/557 |

* cited by examiner

Primary Examiner—Nay Maung
Assistant Examiner—Raymond Persino
(74) Attorney, Agent, or Firm—Dilworth & Barrese, LLP

(57) ABSTRACT

A method of providing data communication services between an external electronic device such as a personal computer which is connected to a communication device such as a mobile phone, comprising the steps of: periodically checking a connection state to generate connection state data, storing said connection state data in a memory, and determining whether to provide said data communication services according to said stored connection state data. A device for performing the method is also disclosed.

18 Claims, 3 Drawing Sheets

METHOD OF PROVIDING A DIGITAL MOBILE PHONE WITH DATA COMMUNICATION SERVICES

This application makes reference to, incorporates the same herein, and claims all benefits accruing under 35 U.S.C. §119 from an application entitled METHOD OF PROVIDING A DIGITAL MOBILE PHONE WITH DATA COMMUNICATION SERVICES earlier filed in the Korean Industrial Property Office on Sep. 7, 1998, and there duly assigned Ser. No. 36798/1998.

BACKGROUND OF THE INVENTION

1. Field of the Invention

The present invention relates to a method of providing a mobile phone with data communication services, and more particularly a method of providing data communication services for a mobile phone connected to external electronic equipment, such as a personal computer (PC) or fax machine, via a data cable.

2. Description of the Related Art

Generally, a mobile phone may be used to provide data communication services for equipment connected to the mobile phone, such as a personal computer (PC) or fax machine connected to the mobile phone, by exchanging data files with the computer or fax machine through a radio channel allotted for voice communication. The connection between the external equipment is typically through the provision of a data cable. However, conventional mobile phones have no means of detecting the status of the connection between the data cable attached to the PC and the mobile phone. Consequently, if the data cable between the mobile phone and the PC is inadvertently disconnected during data communication, the mobile phone continues the radio channel communication as if it were still connected to the computer or fax machine, without detecting the disconnection. This may lead to a mobile phone service provider billing a user for time during which the user did not receive data communication services due to the undetected disconnection of the data cable.

SUMMARY OF THE INVENTION

It is an object of the present invention to provide a mobile phone with a method of terminating a data communication connection when a data cable between a mobile phone and a personal computer (PC) is inadvertently disconnected during data communication, thereby not exposing a user to billing for time during which he was not receiving data communication services.

The present invention, a method of providing data communication services for a PC connected by a data cable to a mobile phone, comprises the steps of periodically checking a connection state of the data cable to generate connection state data, storing the connection state data in a memory, periodically updating the connection state data, and determining whether to provide data communication services based on the connection state data.

BRIEF DESCRIPTION OF THE DRAWINGS

The present invention will now be described more specifically with reference to the attached drawings.

DETAILED DESCRIPTION OF THE PREFERRED EMBODIMENTS

Figure 1:
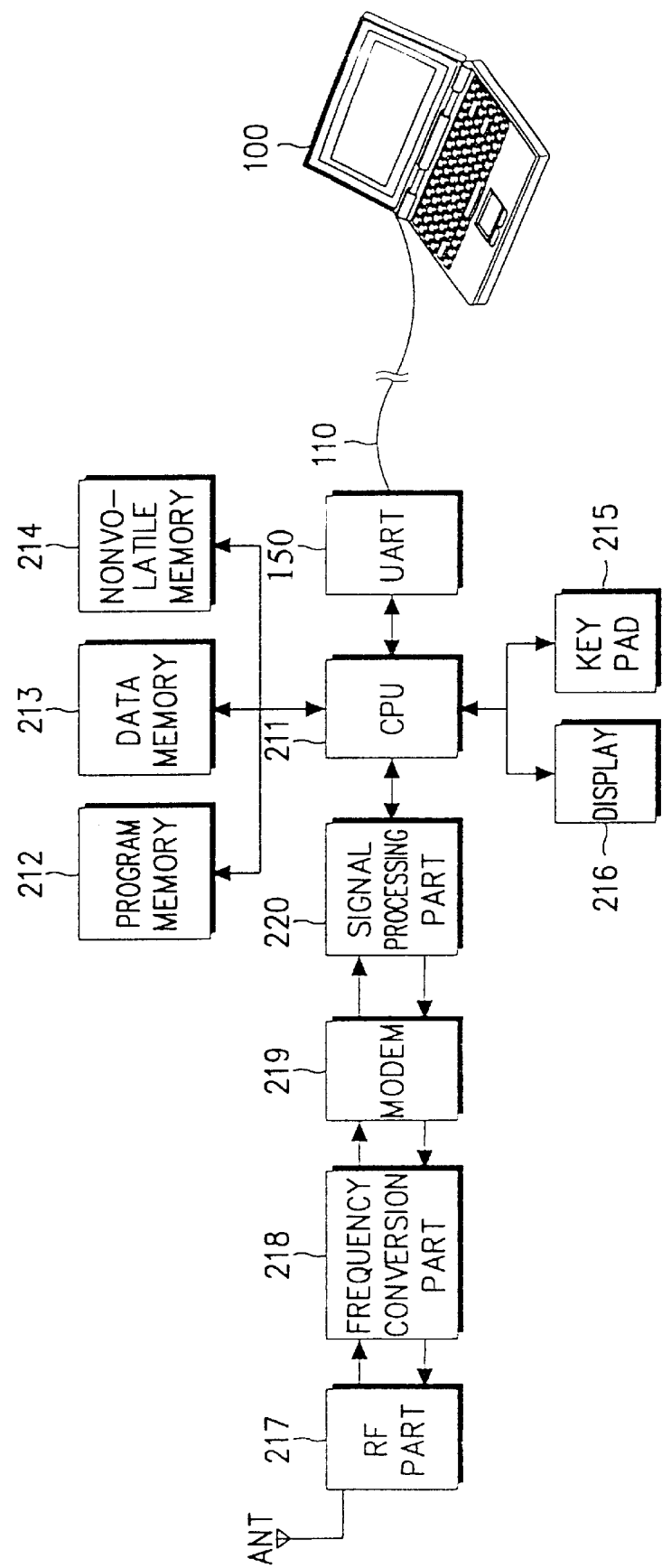
FIG. 1 is a block diagram illustrating a digital mobile phone and its connection through a data cable to an external PC in accordance with the present invention.

Referring now to the drawings, in which like reference numerals represent similar or identical elements, in particular with respect to FIG. 1, data communication between a mobile phone and a personal computer (PC) 100, is controlled by a central processing unit (CPU) 211 which controls the functions of the mobile phone. Programs for controlling the functions of the mobile phone are stored in a program memory 212, which may be a flash memory. Data temporarily generated from the operation of the mobile phone is stored in a data memory 213, which may be a random access memory (RAM). A nonvolatile memory 214, which is provided to store phone numbers for shortcut dialing, and may include system parameters, may be an electrically erasable programmable read-only memory (EEPROM). A key pad 215 generates key signals representing commands and data for input to CPU 211. State information during operation of the mobile phone is displayed on a display 216 under control of CPU 211, where the display 216 may be a liquid crystal display (LCD). The communications part of the mobile phone comprises an RF (radio frequency interface) part 217, frequency conversion part 218, modem 219, and signal processing part 220, all of which are controlled by CPU 211. The signal processing part 220 comprises the following (not shown): an encoder (interleaver & encoder), decoder (deinterleaver & decoder), vocoder, and PCM codec (coder/decoder). For simplicity, the transmitting and receiving parts are not separately shown in the drawing. Also omitted in the drawing are lines representing the control of CPU 211, a sound signal processing circuit, and other components which are not required for an understanding of the present invention.

In transmission mode, data is encoded by the signal processing part 220, modulated by the modem 219, subjected to frequency-up-conversion by the frequency conversion part 218, band-pass filtered and amplified by the RF part 217, and finally aired through the antenna ANT. In receiving mode, a weak radio frequency signal coming through the antenna ANT is low-noise amplified and filtered into the base band by RF part 217, subjected to frequency-down-conversion by the frequency conversion part 218, demodulated by the modem 219, and decoded by the signal processing part 220.

CPU 211 performs data communication with PC 100 through a UART (Universal Asynchronous Receiver Transmitter) 150 in asynchronous transfer mode (ATM). UART 150 is a serial/parallel conversion ATM transceiver that enables data communication between the mobile phone and PC 100, through the provision of data cable 110, which supports serial communication used for exchanging data between the mobile phone and PC 100. While the preferred embodiment of the present invention provides for connection between the PC 100 and the mobile phone by means of data cable 110, it is also contemplated that other connection means may be provided, such as a wireless link or remote connection.

Figure 2:
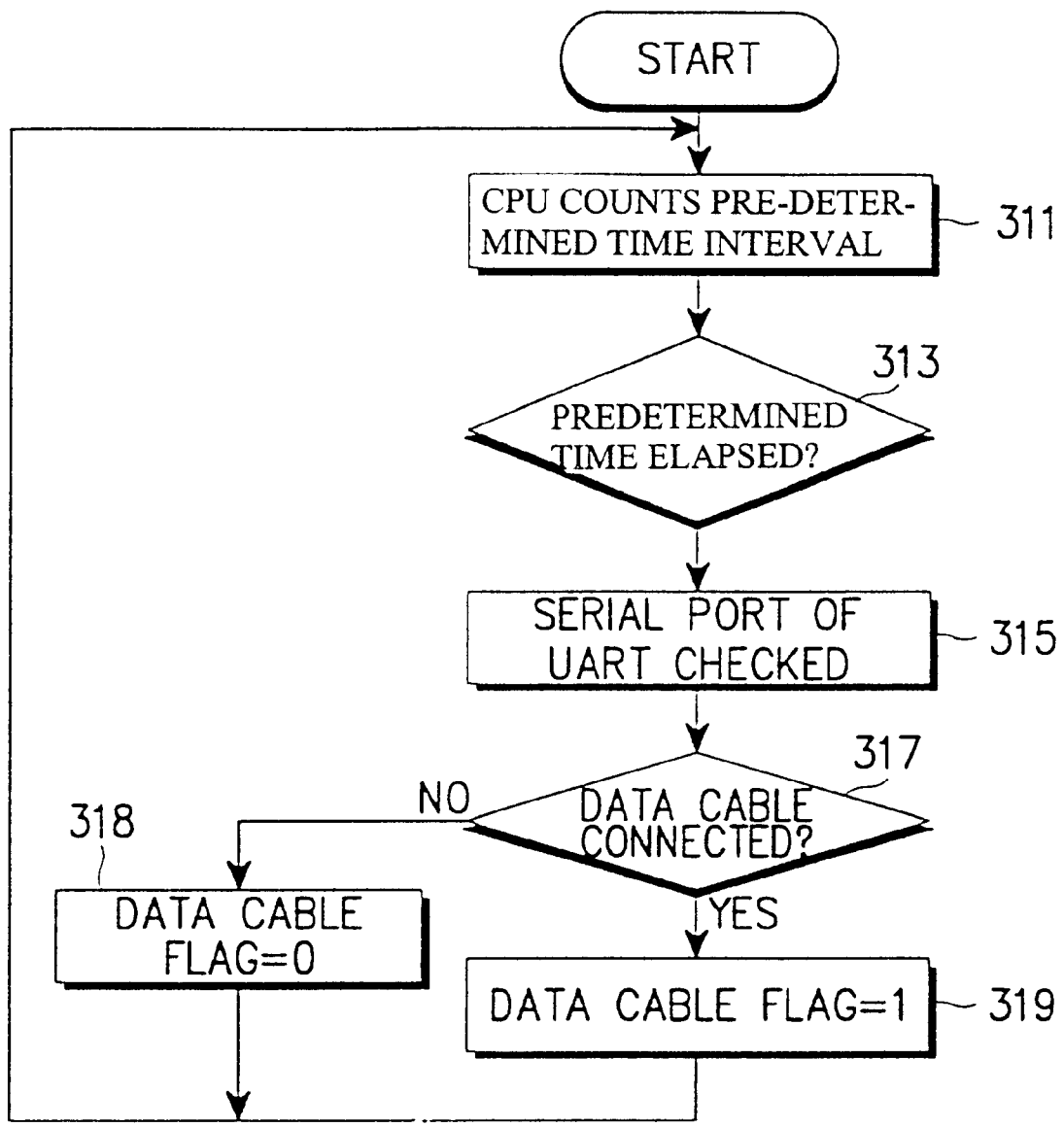
FIG. 2 is a flow chart illustrating a process for checking the connection state of the data cable connected between the mobile phone and the PC in accordance with the present invention.

FIG. 2 describes the detection of the connection state of the data cable 110 with respect to the external equipment (i.e. PC 100) and the mobile phone. In step 311, CPU 211 repeatedly counts a predetermined time for periodically checking the state of the serial port of UART 150. When the given time has elapsed in step 313, CPU 211 checks the serial port of UART 150 in step 315 to determine whether the connection between UART 150 and PC 100 by the data cable 110 is intact. When the connection of the data cable 110 is found to be intact in step 317, CPU 211 sets a data cable flag stored in a given region of the data memory 213 as "1" in step 319. However, if the connection of the data cable is found to be disconnected in step 317, CPU 211 sets the data cable flag as "0" in step 318. The data cable flag may alternatively be defined in a given region of the nonvolatile memory 214 instead of the data memory 213. Subsequent to step 318 or 319, the process returns to step 311 and is repeated.

Figure 3:
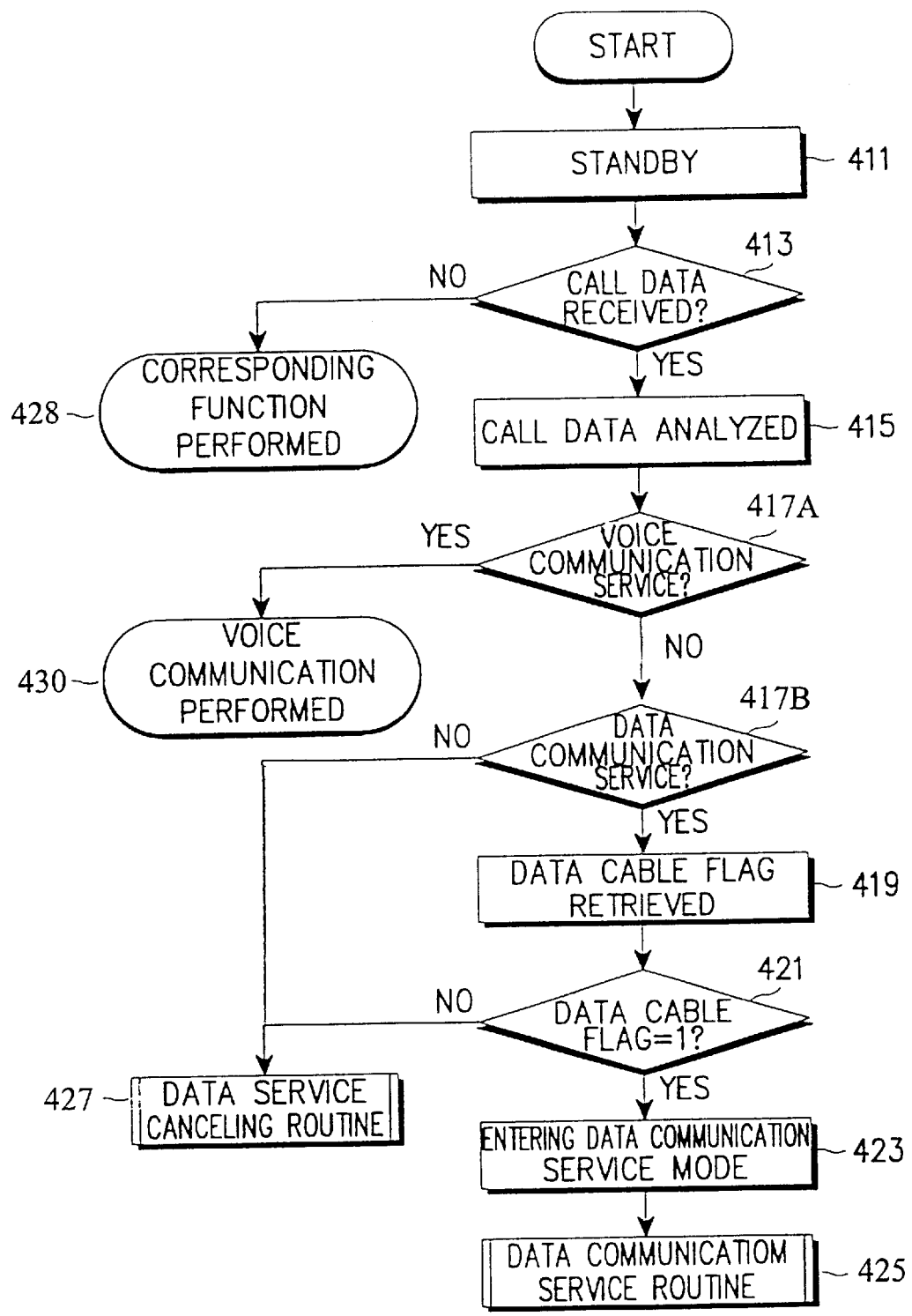
FIG. 3 is a flow chart illustrating a process for providing data communication services in the mobile phone according to the present invention.

Referring now to FIG. 3, when the mobile phone is in standby mode in step 411, CPU 211 checks in step 413 for call data received by the mobile phone via communications part 217–220 as shown in FIG. 1. If call data has not been received in step 413, other functions are performed at step 428, such as editing phone numbers, entering key inputs, etc. However, if call data has been received in step 413, it is analyzed in step 415 to determine in steps 417A and 417B whether it represents voice communication services or data communication services. If in step 417A the call data represents voice communication services, then voice communication services are initiated at step 430; otherwise, the process goes to step 417B. If the call data represents data communication services in step 417B, the process goes to step 419 to retrieve the periodically revised data cable flag from the data memory 213 (or non-volatile memory 284), and then the process goes to step 421; otherwise, the process goes to a data service cancelling routine at step 427. In step 421, the connection state of the data cable is determined according to the value of the data cable flag. If the flag is detected as "1", the data cable is normally connected with UART 150 so as to properly provide data communication services and enters the data communication service mode in step 423. At this point, the data communication services routine is called at step 425. If the data cable flag is not detected as "1" in step 421, the connection of the data cable is abnormal, or disconnected, and data communication services are not initiated and data service is cancelled at step 427. Furthermore, the processes of FIGS. 2 and 3 are repeatedly performed to continuously check the connection state of the data cable during an ongoing call, and to cancel data communication services if the data cable flag is not detected as "1".

Thus, the invention provides a means for continuously checking the status of the connection between a mobile phone and the PC 100, typically through the provision of data cable 110, so that the user may avoid unjustified billing fees during inadvertent disconnection of the data cable 110.

While the present invention has been described with specific embodiments accompanied by the attached drawings, it will be appreciated by those skilled in the art that various changes and modifications may be made thereto without departing from the gist of the present invention. For example, the invention is applicable to various communications devices, such as a microwave relay or a communications satellite, and is not restricted to a mobile telephone. As a further example, the invention is applicable to various communications links between the mobile phone and the connected PC, such as a wireless communications link, and is not restricted to a data cable link.

What is claimed is:

1. A method of controlling a radio data communication channel of a mobile phone having a connection with an external electronic equipment, comprising the steps of:

monitoring a data communication state of the connection, wherein the data communication state is separate from the radio data communication channel; and holding the radio data communication channel based on the data communication state.

2. The method of claim 1, wherein said monitoring step is performed periodically in accordance with a predetermined time period.

3. The method of claim 1, wherein the external equipment comprises a personal computer.

4. The method of claim 3, wherein the personal computer is connected to the mobile phone by a cable.

5. The method of claim 1, wherein the external equipment comprises a fax machine.

6. The method of claim 1, further comprising the step of storing a connection state data in a memory of said mobile phone, and periodically updating said connection state data for storage in said memory.

7. A method of providing data communication services to a communications device based on a connection state between said communications device and an external electronic equipment, wherein said connection state is separate from said data communication service provided to said communication device, comprising the steps of:

setting a data flag indicative of whether said connection state between said external electronic equipment and said communications device is normal;

determining whether call data received by the communications device indicates whether said data communication services are being provided;

retrieving said data flag when said call data indicates said communication services are being provided; and determining whether to continue providing said data communication services based on said data flag.

8. The method of claim 7, wherein data communication services are provided depending whether said data flag is set to "1" or "0", such that services are provided when said data flag is set to "1".

9. The method of claim 8, further comprising the step of determining whether to cancel an ongoing data communication services according to the updated data flag, said data communication services being cancelled when said data flag is set to "0".

10. The method of claim 7, wherein the external equipment is connected to the communications device by a cable.

11. The method of claim 7, wherein the external equipment is a personal computer.

12. The method of claim 7, wherein the communications device is a mobile phone.

13. The method of claim 7, wherein the communications device is a communications satellite.

14. The method of claim 7, further comprising the step of periodically checking the connection state so as to update the data flag.

15. A mobile phone for transceiving data communication services and for separately communicating with a computer, comprising:

a universal asynchronous receiver transmitter (UART) for receiving data from the computer;

a memory for storing a data flag representative of whether a connection state between the UART and the computer is normal; and a processor for checking the connection state for setting the data flag according to the connection state, and for determining whether to provide data communication services to the mobile phone according to the state of the data flag.

16. The mobile phone of claim 15, wherein the UART connects the mobile phone to the computer by means of a data cable.

17. The mobile phone of claim 15, wherein the processor periodically checks the connection state to update the data flag.

18. The mobile phone of claim 17, wherein the processor further determines whether to cancel an ongoing data communication according to the state of the updated data flag.

* * * * *